INVENTOR.
Edward G. Robillard

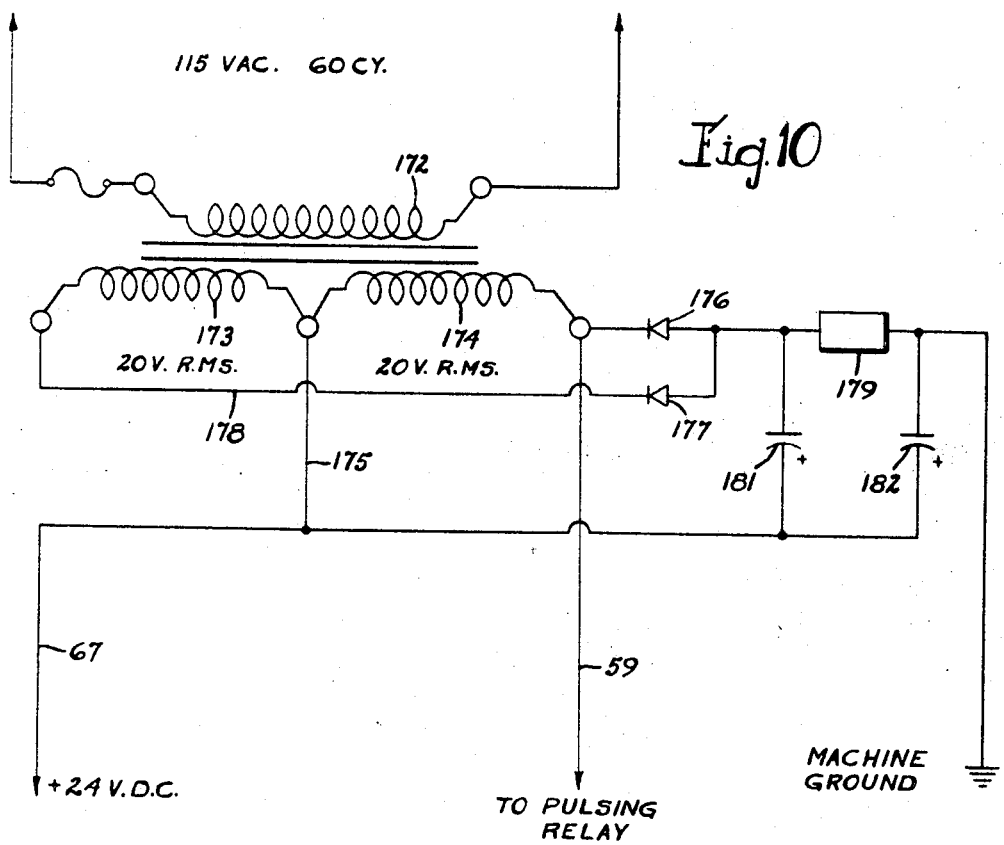
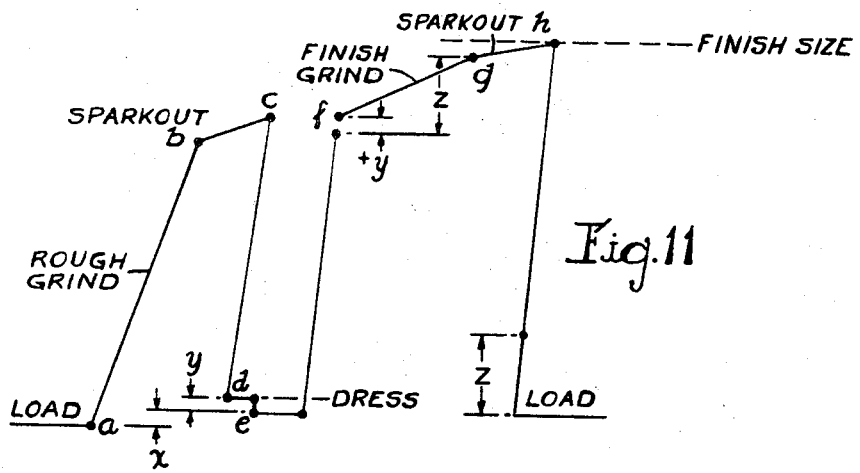

United States Patent Office 3,403,480
Patented Oct. 1, 1968

3,403,480
MACHINE TOOL USING THE ABRASION PROCESS
Edward G. Robillard, Leicester, Mass., assignor to The Heald Machine Company, Worcester, Mass., a corporation of Delaware
Filed Aug. 26, 1965, Ser. No. 482,846
9 Claims. (Cl. 51—165)

ABSTRACT OF THE DISCLOSURE

This invention relates to a machine tool and, more particularly, to a grinding machine having dress compensation using a pulse-operated stepping motor.

Figure 1:
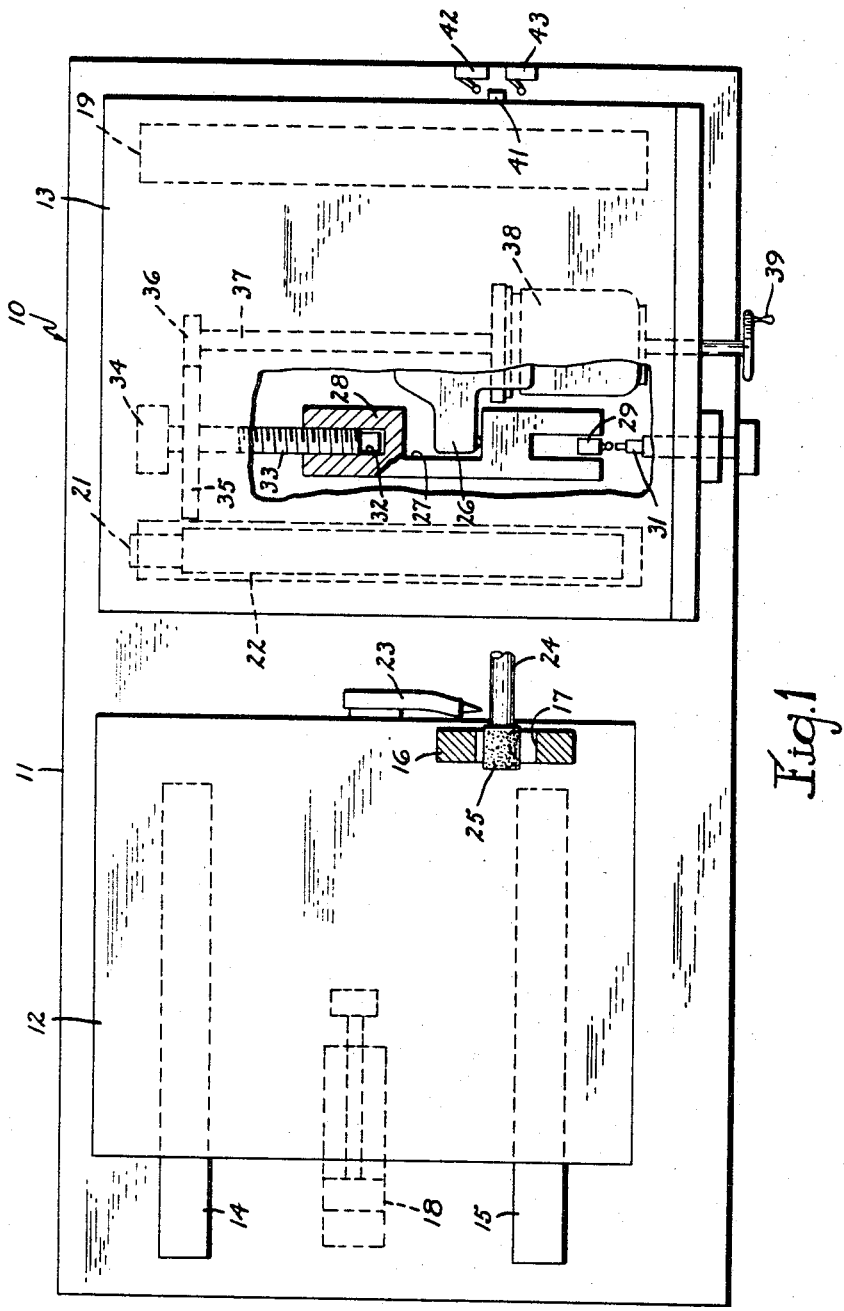

In the feeding of a tool toward the surface of a workpiece in a machine tool, a number of factors enter into the production of accurately-generated surfaces. One of the major problems is that of wear on the tool, particularly where the location of the surface to be generated is determined by moving the tool until its carriage strikes a cross-feed stop. The problem is particularly accentuated in a grinding machine, because a grinding cycle is often used in which the grinding is interruped to dress the wheel and the wheel with its accurately, smoothly dressed surface is then brought into contact with the workpiece for a finish grinding operation. When a cross-feed stop type of size control is used, the removal of a small amount of wheel surface during dressing produces an inaccuracy in the final size of the workpiece. This inaccuracy is partly overcome by th use of a so-called "compensation" movement in the feed mechanism. However, when the wheel is returned after dress to begin its grind, the wheel in the prior art machines contacts the workpiece surface at the same time that the carriage strikes the cross-feed stop. A number of inaccuracies and irregularities are introduced while the machine is recovering from this shock. Any provision for overcoming all of these difficulties has involved complicated and expensive mechanism; this has, heretofore, discouraged the use of such machine tools because of the complexity of the apparatus and the cost. These and other difficulties have been obviated in a novel manner by the present invention.

It is, therefore, an outstanding object of the invention to provide a machine tool having a simple and inexpensive arrangement for superimposing on the main feed small compensating feeds.

Another object of this invention is the provision of a machine tool having a secondary cross-feed mechanism operated from electrical pulses.

A further object of the present invention is the provision of a grinding cycle in which the "interrupt for dress" system is used but in which inaccuracies (due to shock and wheel damage) after dress are removed.

It is another object of the instant invention to provide a grinding machine tool having a main feed motion and having a relatively simple and inexpensive mechanism for producing additive or subtractive movements during the grinding cycle to produce compensation, new wheel retraction, and a method of stock removal.

It is a further object of the invention to provide a grinding machine including an "interrupt for dress" cycle in which means is provided for assuring that all deflections take place before the wheel contacts the workpiece for the finish grind after dress.

A still further object of this ivention is the provision of a grinding machine using the "interrupt for dress" cycle in which the cycle time is decreased because means is provided to permit the cross-slide to be allowed to feed at rapid traverse to strike the cross-feed stop after dress at the start of the finish grind.

It is a still further object of the present invention to provide a machine tool in which mechanism is provided for using pulses for control of certain portions of the cross-feed in which a control is provided for regulating the flow of pulses to the cross-feed device in accordance with a predetermined selected system.

With these and other objects in view, as will be apparent to those skilled in the art, the invention resides in the combination of parts set forth in the specification and covered by the claims appended hereto.

The character of the invention, however, may be best understood by reference to one of its structural forms as illustrated by the accompanying drawings in which:

FIG. 1 is a schematic view of a machine tool embodying the principles of the present invention.

Figure 2:
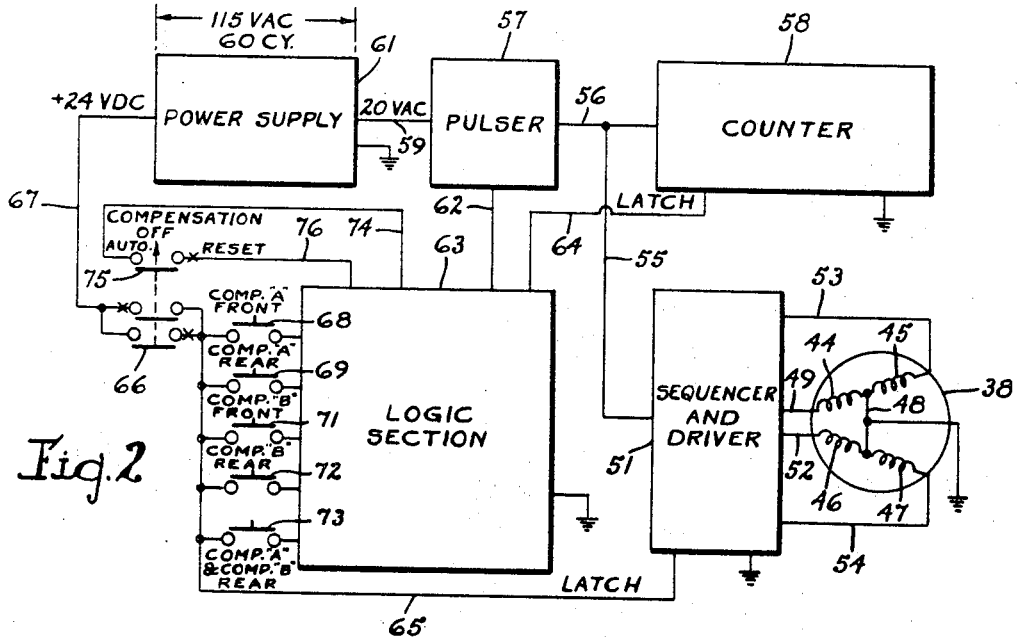
Figure 3:
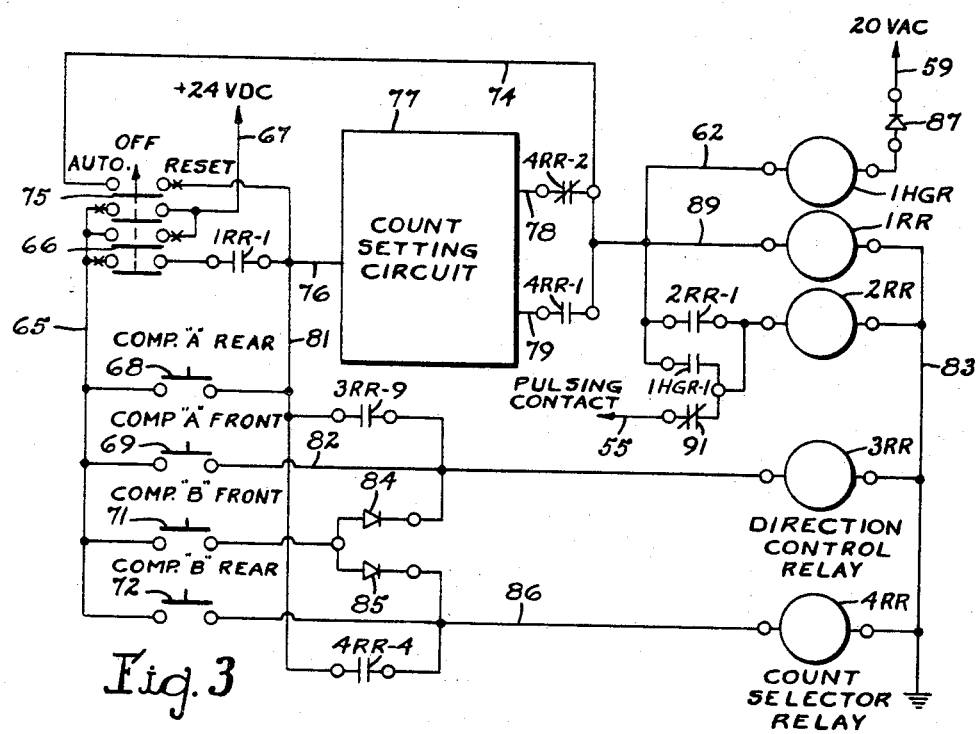
Figure 4:
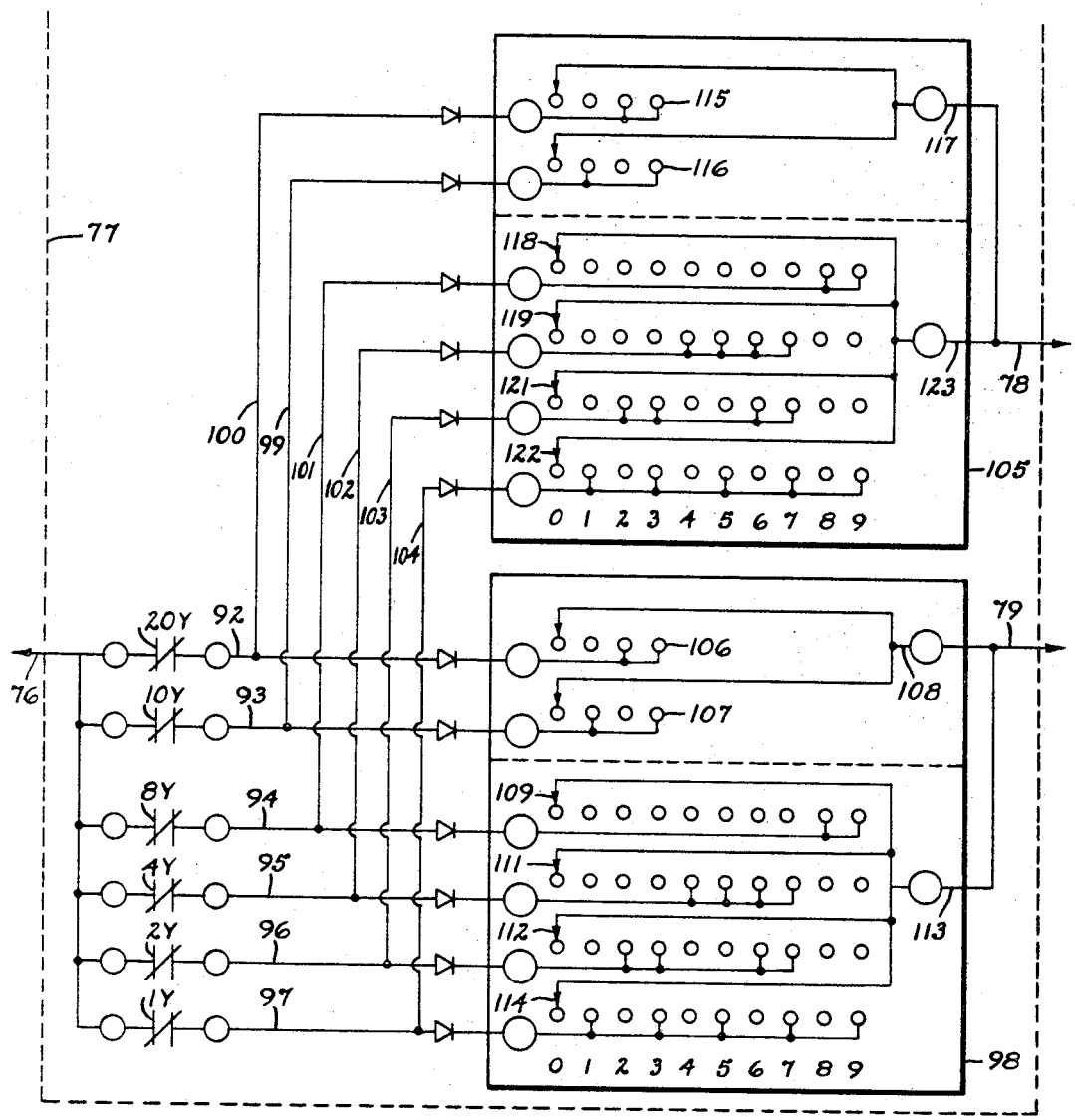
Figure 5:
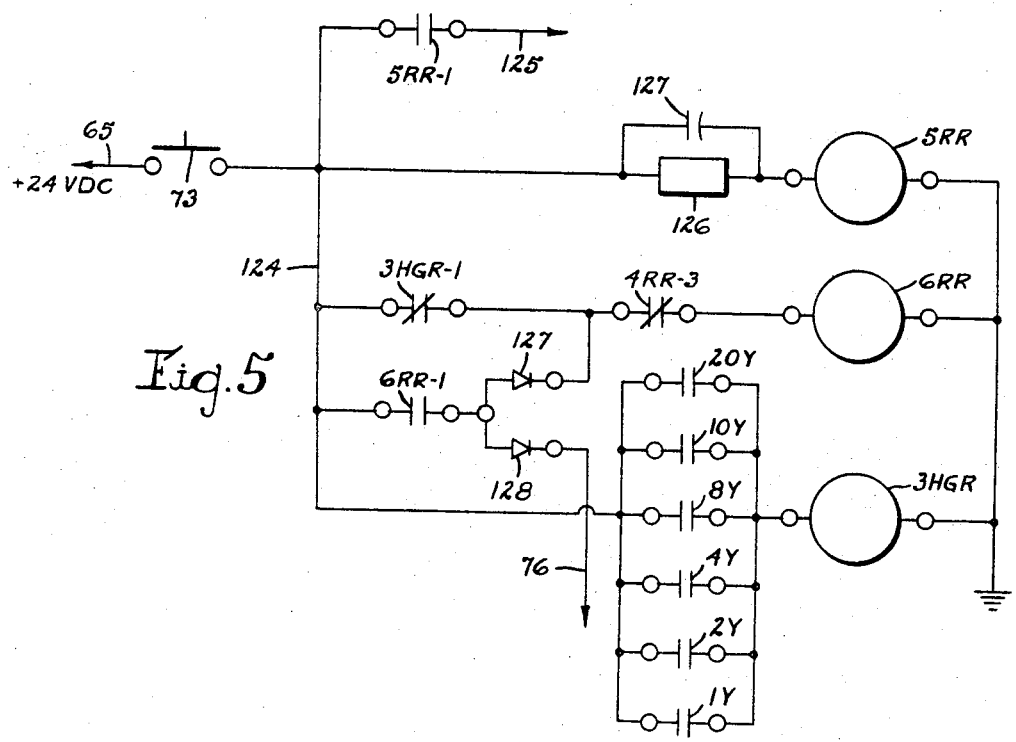
Figure 6:
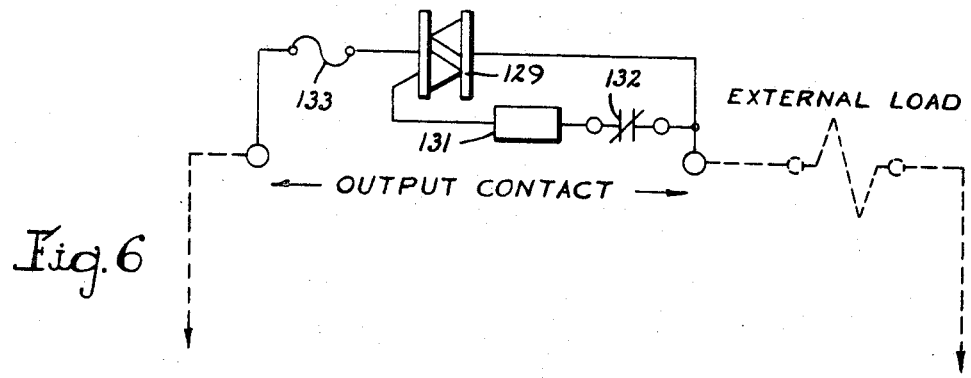
Figure 7:
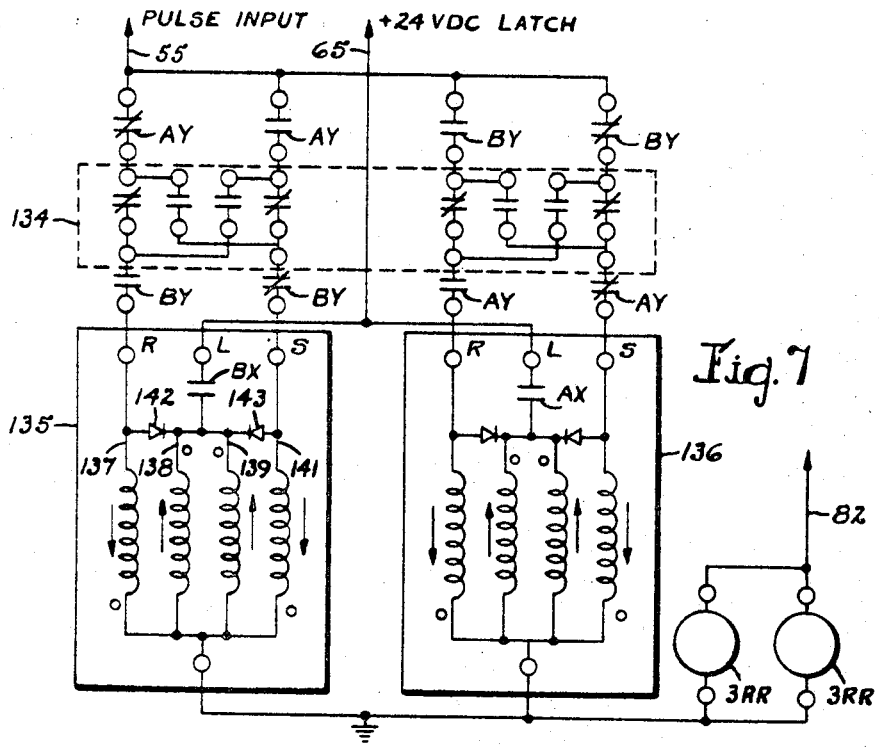
Figure 8:
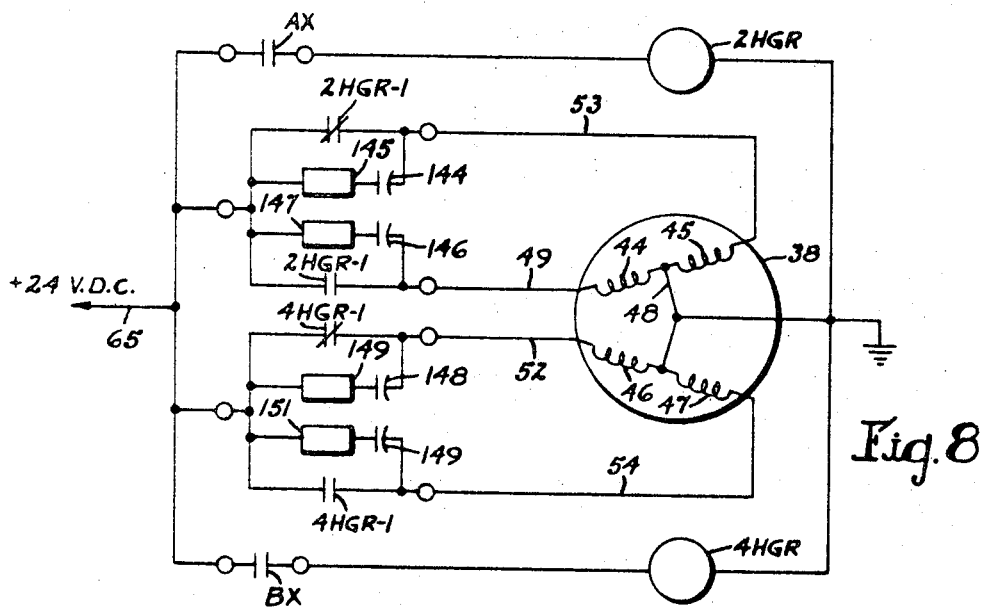
Figure 9:
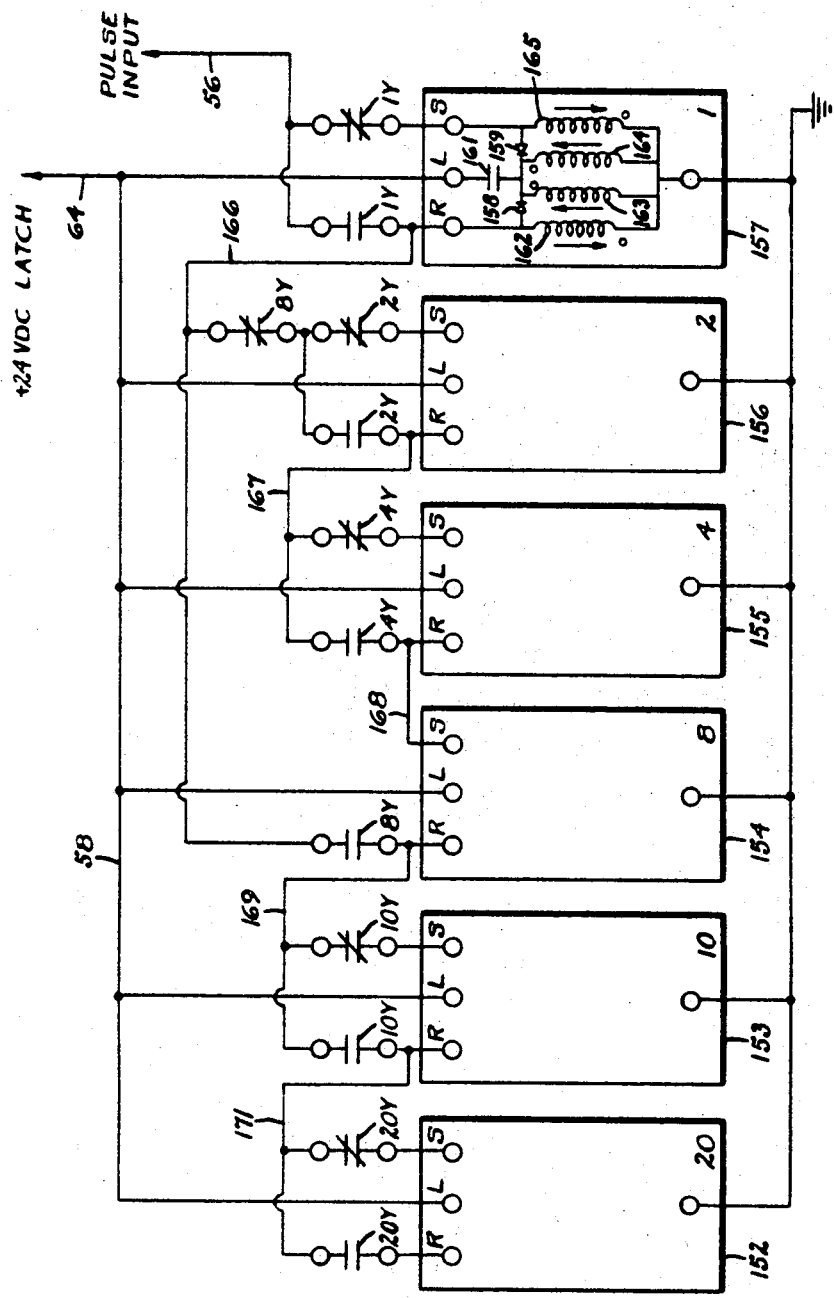

FIG. 2 is a schematic view of electrical apparatus forming a part of the invention, FIG. 3 is a schematic diagram of certain logic and pulsing relay portions of the invention, FIG. 4 is a schematic diagram of a count selector portion of the invention, FIG. 5 is a schematic diagram of a special logic circuit forming part of the invention, FIG. 6 is a schematic diagram of an auxiliary electrical output contact used in the invention, FIG. 7 is a schematic diagram of a sequencer, FIG. 8 is a schematic view of a driver, FIG. 9 is a schematic diagram of a counter, FIG. 10 is a schematic diagram of a power supply, and FIG. 11 is a diagram of a grinding cycle.

Referring first to FIG 1, which best shows the general features of the invention, the machine tool, indicated generally by the reference numeral 10, is shown as an internal grinding machine having a base 11 on which are mouted a workhead 12 and a wheelhead 13. The workhead 12 is provided with ways 14 and 15 for providing movement longitudinally of the axis of the workpiece 16 which is supported on the workhead and subjected to rotation about its axis. For the purposes of illustration, the workpiece 16 is shown as the race of a ball bearing and having an internal bore 17 which is to be finished. A hydraulic cylinder 18 provides the longitudinal feed or motion.

The wheelhead 13 is provided with ways 19 and 21 and with a main hydraulic feed cylinder 22. A fixed dressing apparatus 23 including a diamond is mounted on the workhead 12. Extending from the wheelhead and serving to support and rotate it is a spindle 24 carrying at its outer end an abrasive wheel 25. Extending downwardly from the lower surface of the wheelhead 13 is a horn 26 which lies in a recess 27 formed in a block 28 which rests on the upper surface of the base 11 and is movable independently of the base and of the wheelhead 13. A switch 29 is mounted at the front of the block 28 in position to be engaged by a spindle 31 which, on occasion, by contact with the switch, serves to bring about changes in the grinding cycle. The back end of the block 28 is provided with a threaded bore 32 and in this bore is carried a threaded feed shaft 33 whose rear end is mounted in a bearing 34 and which carries in its intermediate portion a gear 35. This gear engages with a gear 36 mounted on the end of a shaft 37 which extends transversely of the axis of the workpiece 16 and parallel to the feed shaft 33. The other end of the shaft 37 is mounted on the shaft of a motor 38 carried on the base 11, the other end of whose shaft extends from the front of the machine and is provided with a hand wheel 39. The motor 38 is of the type known as a slo-syn which has the ability to rotate in very small angular increments in response to an electrical pulse. Extending from the right side of the wheelhead 13 is a finger 41 which engages switches 42 and 43 on occasion in a manner which will be described more fully hereinafter.

Referring next to FIG. 2, it can be seen that the motor 38 is provided with two coils 44 and 45 connected in series and coils 46 and 47 also connected in series. The common point between the coils 44 and 45 is connected to the common point between the coils 46 and 47 by a line 48, the center point of which is connected to ground. The coil 44 is connected by a line 49 to a sequencer and driver 51, while the free end of the coil 46 is similarly connected by a line 52. The other end of the coil 45 is connected by a line 53 to the sequencer and driver 51 and the other end of the coil 47 is similarly connected by a line 54. The sequencer and driver is connected by a line 55 to a mid-point in a line 56 joining a pulser 57 and a counter 58. The pulser 57, in turn, is connected by a line 59 to a power supply 61 and also by a line 62 to a logic section 63. The counter 58 and the logic section 63 are connected by a line 64. The sequencer and driver 51 is connected by a line 65 to one side of a switch 66, while the other side of the switch is connected by a line 67 to the power supply 61. The power supply is connected to a source of 115 volts, A.C. 60-cycle electricity and produces 20 volts A.C. electricity on the line 59 plus 24 volts D.C. electricity on the line 67. The line 65 is connected to the logic section 63 through switches 68, 69, 71, 72, and 73. A line 74 extends from the logic section 63 and is connected to one side of a contactor 75 forming part of the switch 66, the other side of which is connected back to the logic section 63 by a line 76. As can be seen in this figure the motor 38 is a bifilar slo-syn motor and, in the preferred embodiment, is of the size generating 250 ounce-inches of torque.

FIGS. 3, 4, 5, and 6 show particularly well the logic section 63, the pulser 57, and the arrangements interconnecting them. Forming part of the logic section is the count-setting circuit 77 whose details are shown in FIG. 4. Referring to FIG. 3, extending from the count-setting circuit 77 is the line 76 leading to one side of the switch 75, the other side of which is connected through the line 74 back through a normally-closed contactor 4RR-2, the other side of which is connected to the count-setting circuit by a line 78. The line 74 is also connected to the line 62 leading to the pulser 57 and to one side of a normally open contactor 4RR-1, the other side of which is connected by a line 79 to the count-setting circuit 77. The switch 66 is connected between the line 67 leading to the power supply 61 and the line 65. Switches 68, 69, 71, and 72 are connected on one side to the line 65 and on the other side in various ways. For instance, the switch 68 is connected on the other side to a line 81 which leads to the line 76. The other side of the switch 69 is connected through a line 82 to one side of the coil of a directional control relay 3RR which is connected on the other side to a line 83 leading to ground. A point in the line 82 between the switch 69 and the relay 3RR is connected through a normally open contactor 3RR-9 to the line 81. The other side of the switch 71 is connected through a rectifier 84 to the line 82 and also through a rectifier 85 to a line 86 leading from the other side of the switch 72 to one side of a count selector relay 4RR, the other side of which is connected to the line 83 to ground. The line 81 is connected through a normally-open contactor 4RR-4 to a point in the line 86 between the switch 72 and the coil of the count selector relay 4RR. The coil of a mercury-wetted pulsing relay 1 HGR is connected on one side through a rectifier 87 and the line 59 to the power supply to receive 20 volts A.C. The other side of the coil of the relay 1HGR is connected by a line 62 to the line 74. Similarly, the line 62 is connected by a line 89 to one side of the coil of a relay 1RR, the other side of which is connected to ground by the line 83. The line 62 is also connected through a normally-open contactor 2RR-1 to one side of the coil of a cycle start relay 2RR, the other side of which is connected to the line 83 to ground. Connected around the contactor 2RR-1 is another normally-open contactor 1HGR-1. The common point between the contactor 2RR-1, the coil of the relay 2RR, and the contactor 1HGR-1 is connected to one side of a normally-closed pulsing contact 91, the other side of which is connected to the line 55 leading to the sequencer and driver 51.

Referring to FIG. 4, it can be seen that the count-setting circuit 77 is connected by the line 76 to the rest of the logic section and is connected by the line 78 to the contactor 4RR-2, while it is also connected by the line 79 to the normally-open contactor 4RR-1. The line 76 is connected to one side of counter output contacts 20y, normally-closed contactor 10y, normally-closed contactor 8y, normally-closed contactor 4y, normally-closed contactor 2y, and normally-closed contactor 1y. These contactors are connected by lines 92, 93, 94, 95, 96, and 97, respectively, through rectifiers to a counter switch board 98. The lines 92, 93, 94, 95, 96, and 97 are connected, respectively, by lines 100, 99, 101, 102, 103, and 104 through rectifiers to a counter switch board 105. From the line 92 to the line 93 on the board 98 are connected selector switches 106 and 107 in series and the mid-point between them is connected by a line 108 to the line 79. Lines 94, 95, 96, and 97 are connected to one side of switches 109, 111, 112, and 114, respectively, the other sides of which are connected together and connected through a line 113 to the line 79. In a similar way, the lines 100 and 99 are each connected to one side of switches 115 and 116, the common point between which is connected by a line 117 to the line 78. The lines 101, 102, 103, and 104 are connected to one side each of counter switches 118, 119, 121, and 122, the other sides of which are connected together and through a line 123 to the line 78.

FIG. 5 shows a special logic circuit which will give the sum of both sets of count-setting switches. The switch 73 receives a 24 volt D.C. power from the line 65 and its other side is connected to a line 124. This line is connected through a normally-open contactor 5RR-1 to a line 125 leading to the line 86 (see FIG. 3). The same line 124 is connected through a resistor 126 and a capacitor 127 connected in parallel to the coil of a relay 5RR to ground. Line 124 is similarly connected through a normally-closed contactor 3HGR-1 and a normally-closed contactor 4RR-3 and the coil of a relay 6RR in series to ground. The line 124 is connected to one side of a normally-open contactor 6RR-1, the other side of which is connected, first of all, through a rectifier 127 to a mid-point between the contactors 3HGR-1 and 4RR-3. The other side of the normally-open contactor 6RR-1 is also connected through a rectifier 128 to the line 76. The line 124 is also connected to one side of a series of normally-open contactors 20y, 10y, 8y, 4y, 2y, and 1y connected in parallel, the other sides of which are connected together and connected to one side of the coil of a relay 3HGR, the other side of which is connected to ground.

FIG. 6 shows an auxiliary electrical output contact. This circuit consists of a triac tube 129 which, in the preferred embodiment, is a G.E. type ZJ257B and a resistor 131 which is operated by a reed contact 132 from one of the relay boards. The circuit is protected from overloads by means of a fuse 133.

FIG. 7 shows wiring diagram of the stepping motor sequencer 51. Entering the circuitry is the line 55 arriving from the pulser 57, the line 65 which is connected back to the switches 68, 69, 71, 72, and 73 and the line 82 which is connected back into the logic circuit. The contacts contained within the dotted box 134 are contactors forming part of the relay 3RR for directional control of the stepping motor. Line 55 is connected to one side each of the normally-closed relay contactor AY, the normally-open relay AY, the normally-open relay BY, the normally-closed contactor BY, the other sides of which are connected to the contacts within the box 134. The outputs at these boxes are connected through the normally-open contactor BY, the normally-closed contactor BY, the normally-open contactor AY, the normally-closed contactor AY to flip-flops 135 and 136, the other side of which are connected to ground. Similarly, the coils of the relays 3RR are connected on one side to the line 82 and on the other side to ground. Flip-flop 135 is provided with a normally-open contactor BX, one side of which is connected to the line 65 and the other side of which is connected to one side of the series of coils 137, 138, 139, and 141, the other ends of which are connected together and connected to ground. The coils 137, 138 are connected by a rectifier 142, one side of which is connected to the normally-open contactor BY and the other side of which is connected to the normally-open contactor BX. Similarly, the coils 139 and 141 are connected by a rectifier 143, one side of which is connected to the normally-closed contactor BY and the other side of which is connected to the normally-open contactor BX. The flip-flop 136 is constructed in a manner similar to the flip-flop 135.

FIG. 8 shows the details of the driver 51. A line 65 carrying 24 volt D.C. is connected to a normally-open contactor AX and the coil of the mercury-wetted relay 2HGR in series to ground. Similarly, the line 65 is connected to the normally-open contactor BX and the coil of the mercury-wetted relay 4HGR in series to ground. The line 53 of the motor 38 is connected through a normally-closed contactor 2HGR–1 to the line 65 and around this contactor is connected a capacitor 144 and a resistor 145 in series. The line 49 of the motor 38 is connected through a normally-open contactor 2HGR–1 to the line 65 and around this contactor is mounted the capacitor 146 and a resistor 147 in series. The line 52 of the motor 38 is connected through a normally-closed contactor 4HGR–1 to the line 65 and around this last contactor is connected a capacitor 148 and a resistor 149 in series. Lastly, the line 54 from the motor 38 leads through a normally-open contactor 4HGR–1 to the line 65 and around this capacitor is mounted a capacitor 149 and a resistor 151 in series.

FIG. 9 shows the details of the counter 58 which, in the preferred embodiment, is a binary coded decimal counter. The line 64 enters the system from the logic section 63, while the line 56 enters the counter from the pulser 57. Mounted in the device are flip-flops 152, 153, 154, 155, 156, and 157 the lower ends of which are all connected to ground and each of the flip-flops is provided on its input side with three binding posts R, L, and S. For instance, using the flip-flop 157 as an example, the line 64 is connected directly to the binding post L, the line 56 is connected through the normally-closed contactor 1y to the binding post S, while the line 56 is connected through the normally-open contactor 1y to the binding post R. The body of the flip-flop 157 is provided with oppositely-connected rectifiers 158 and 159, the common point of which is connected through a normally-open contactor 161 to the binding post L. The common point between the binding post R and the rectifier 158 is connected through a coil 162 to ground. The common point between the rectifier 158 and the contactor 161 is connected through a coil 163 to ground. The common point between the rectifier 159 and the contactor 161 is connected through a coil 164 to ground. The common point between the rectifier 159 and the binding post S is connected through a coil 165 to ground. The interiors of the other flip-flops in the counter are similarly formed. A common point between the normally-open contactor 1y and the binding post R of the flip-flop 157 is connected to a line 166. This line is connected through a normally-closed contactor 8y and the normally-closed contactor 2y to the binding post S of the flip-flop 156. The common point between the contactors 8y and 2y is connected through a normally-open contactor 2y to the binding post R of the flip-flop 156. The common point between the contactor 2y and the binding post R is connected by a line 167 through a normally-closed contactor 4y to the binding post S of the flip-flop 155 and also through a normally-open contactor 4y to the binding post R of the flip-flop 155. A line 168 extends between the binding post R of the flip-flop 155 and the binding post S of the flip-flop 154. The line 166 which is connected to a common point between the normally open contactor 1y and the binding post R of the flip-flop 157 is connected through a normally-open contactor 8y to the binding post R of the flip-flop 154. A line 169 extends from the common point between the contactor 8y and the binding post R of the flip-flop 154 and this line is connected through a normally-closed contactor 10y to the binding post S of the flip-flop 153 and also is connected through a normally-open contactor 10y to the binding post R of the flip-flop 153. A line 171 extends from a common point between the normally-open contactor 10y and the binding post R of the flip-flop 153 through a normally-closed contactor 20y to the binding post S of the flip-flop 152 and also through a normally-open contactor 20y to the binding post R of this same flip-flop. Finally, all of the binding posts L or all of the flip-flops are connected to the line 64. The flip-flop 157 is the "1" flip-flop, the flip-flop 156 is the "2" flip-flop, the flip-flop 15 is the "4" flip-flop, the flip-flop 154 is the "8" flip-flop, the flip-flop 153 is the "10" flip-flop, and the flip-flop 152 is the "20" flip-flop.

FIG. 10 shows the details of the power supply 61. This is provided with a transformer 172 whose primary coil is connected to a source of 115 volts 60-cycle A.C. electricity. It is provided with two output coils 173 and 174 and the common point is connected by a line 175 to the line 67 leading to the logic section 63. The free end of the coil 174 is connected by the line 59 to the pulser 57. This same end of the coil 174 is connected through a rectifier 176 and a rectifier 177 to the other end of the coil 173 by means of a line 178. The common point between the rectifiers 176 and 177 is connected through a resistor 179 to ground. The common point between the rectifier 176 and the resistor 179 is connected by a capacitor 181 to the line 67 and a similar capacitor 182.

The operation of the machine tool will now be readily understood in view of the above description. With the workhead rotating the workpiece 16 about its axis and the wheelhead 13 rotating the spindle 24 and the abrasive wheel 25 about its axis, it is only necessary to bring the workpiece 16 and the abrasive wheel 25 together in proper relationships to finish the bore 17. Refer first to FIG. 1, which shows the grinding machine somewhat diagrammatically and to FIG. 11 which is a graph of the grinding cycle wherein the abscissa represents time and the ordinate represents distance. Let us assume that the new workpiece 16 has been loaded into the machine and the surface of the wheel 25 lies along the line terminating at the point $a$. The longitudinal feed cylinder 18 is operated so that the workhead slides over the ways 14 and 15 and the workpiece is moved so that the wheel 25 lies within the bore 17 and the workpiece and abrasive wheel are co-extensive. At that time, hydraulic fluid is admitted to the cylinder 22 to press the wheel against the back surface of the bore 17 to bring about a grinding operation. The present machine is shown as being of the controlled-force type which means that the force between the wheel 25 and the workpiece 16 is regulated by the hydraulic fluid in the cylinder 22, but that the rate of feed of the wheelhead 13 relative to the base 11 is not controlled. The force at point $a$ rises considerably and a rough grinding operation takes place, the wheel 25 advancing through the material to the point $b$, which point is determined by the switch 29 as it is struck by the finger 31 on the wheelhead 13. At that time, the machine cross slide feed stops because switch 29 is also a positive stop and grinding continues by relieving the deflection in the spindle 24 along a sparkout cycle terminating at the point $c$. At that time, oil is admitted to the other side of the cylinder 22 to retract the wheelhead 13 toward the front and draw the wheel away from the surface of the bore.

The wheelhead 13 is retracted so that the surface of the wheel occupies the position *d*. It will be noted that in FIG. 11 this point of retraction fails to reach the same line as the "load" line (the point *a*) and misses it by a distance equal to the sum of a distance *x* and a distance *y*. Now, the rearward retraction point is determined by the horn 26 on the bottom of the wheelhead striking the forward edge of the recess 27 in the block 28. During the rough grind part of the cycle, when the horn 26 was moving away from this forward edge of the recess 27 and made no contact at all with the block 28, the block was being moved. This was done by the introduction of electrical pulses into the motor 38, causing its shaft 37 to rotate. These rotations operated through the gear 36 and the gear 35 to rotate the feed shaft 33. Since this shaft is threaded into the end of the block 28, it causes the block to move toward the rear of the machine. The motor 38 rotates through a small angle with each electrical pulse received. The number of pulses are selected in a predetermined amount and they cause the block 28 to move rearwardly. This means that, when the wheelhead 13 tries to retract, it is prevented from going back as far as it was when the cycle started. The amount *x* is the amount that is normally used to compensate for dressing in grinding machines of this type, while the amount *y* is an additional amount inserted to assure that stress does not take place at the beginning of the finish grind portion of the cycle, as will be described further hereinafter.

Once the wheel 25 has been retracted, the cylinder 18 is operated to move the workhead 12 to the left and this causes the diamond 23 to pass over the wheel 25, thus removing a portion of the surface of the wheel so that the wheel occupies a position indicated by the letter *d*. The compensating block 28 is now retracted to the front of the machine by the retraction increment *y* to a position *e* by the introduction of electrical pulses into motor 38 causing its shaft 37 to rotate. The diamond 23 will now clear the wheel 25 by a distance *y*. The cylinder 18 is then reversed to cause the wheel 25 to move back into the bore 17 and the feed oil is admitted to the cylinder 22 to move the wheel toward the workpiece for the finish grind. As the wheelhead 13 moves rearwardly in the machine to carry the abrasive wheel 25 toward contact with the workpiece surface, it does so at a rapid traverse rate determined by the controls admitting oil to the cylinder 22. This traverse rate is much greater than the grinding rate, particularly the grinding rate in a finish grind. If the wheel were permitted to strike the workpiece while moving at this rapid speed, it would damage the wheel and it would be some time before the wheel and spindle would stop vibrating and would settle down to perform a grinding function in a proper manner. For that reason, means is provided to stop the wheelhead 13 some distance before the contact and that distance is the increment *y* previously referred to. In other words, because of the introduction of the retraction increment *y* into the cycle, the wheel fails by a distance *y* to reach the workpiece surface. However, this situation does not exist for very long because the motor 38 has been operating in reverse and has moved the block 28 forwardly carrying the switch 29 forwardly by a predetermined amount *z* to position *g*, so that the wheelhead is permitted to come into contact with the workpiece and to perform a finish grind. The oil pressure in the cylinder 22 will produce this grinding force; the oil pressure determines the amount of force between the wheel and the workpiece in accordance with the controlled-force method of grinding. The finish grind would start at the point *f* and terminate by the contact of the finger 31 with the switch 29 at the point *g*, after which a short sparkout would take place until final size *h* has been reached. Then, the wheel would be retracted by the main feed cylinder 22 and by retracting the compensating block 28 to the front of the machine by the feed increment *e* to the loading position.

The dressing of the wheel during each cycle reduces, of course, a fine finish in the workpiece surface, but also reduces the diameter of the wheel. Eventually, the size of the wheel becomes too small to be useful (as determined by switch 42) and it is necessary to change wheels. At that time, when the retraction cycle takes place, the motor 38 is provided with pulses at a steady rate to cause the block 28 to move forwardly so that the wheelhead 13 will occupy a position determined by the switch 43 commensurate with having a large diameter new wheel on the spindle 24. This new wheel is then dressed and the cycle progresses from there.

In the preferred embodiment, the feed shaft 33 is a 5-pitch ball screw providing a large spring constant near the compensating block or slide 28 to make it a suitable feed stop. The gear train to the gears 35 and 36 is 20:1, so that the combination of this gear train and the feed screw 33 will move the block 28 a distance of .00050 inch for each step of the motor. The hand wheel 39 can be used to position the slide manually and also serves as a compensation indicator.

All of the automatic motions of the compensating block 28, such as compensation, retraction, and new wheel reset, are actuated by means of the stepping motor 38. This stepping motor is controlled by means of the logical control unit which receives its signals from the machine.

The control unit used on the present machine is especially designed for use with the motor 38 and converts 60-cycle electrical power into the correct switching sequence needed to drive the motor at 200 discreet steps of rotation per revolution. The logic circuitry has built-in circuitry to index the motor a preset number of pulses in either direction for each input command. This unit contains two independent preset counts, both of which can control movements up to 39 steps; a third preset count is added to obtain the feed increment *e*. Additional count-setting switches can be connected to the unit, if more count values are desired. The count-setting controls can be by-passed to run the motor in either direction continuously. In this method of operation, the motor will run at a 60 step-per-second rate for the duration of the switch closure, and this type of operation is used where the slide is reset at "wheel wear" for providing a new wheel.

As is evident in FIG. 2, the control unit can be broken down into a logic section 63, a pulser 57, a sequencer and driver 51, and a counter 58, all of which are energized by means of a 24-volt D.C. power supply 61.

The logic section shown in FIG. 3 controls the entire slide control unit and contains cycle start and stop functions, directional control logic on the stepping motor, and it engages the appropriate count setting switch. It also contains circuitry to by-pass the count-setting switches for the continuous stepping mode of operation of the motor. The circuit consists principally of two plug-in relay boards and two or more count-setting switches.

Another function of this logic circuit is to provide a special output to give the sum of the two count-setting switches (compensation and retraction). The circuit is used on controlled-force grinding machines equipped especially for the interrupt-for-dress cycle. A wiring diagram of this special circuit is shown in FIG. 5. One of the reed relays has a resistance-capacitor network in series with its coil to cause the reed to close momentarily when +24 volts is applied to the circuit. This will provide a circuit to the unit to step the number of increments on the "retraction" switch at the rear of the machine. When this count is reached and the counter resets to zero, another reed relay is energized. This reed provides for a signal for the unit to step a number of increments on the "compensation" switch to the rear of the machine.

The logic circuit also provides an electrical output for auxiliary control purposes when the motor is stepping. This circuit is shown in FIG. 6 and the circuit consists of a G.E. Type ZJ257B triac and the resistor. It is operated by means of a reed contact from one of the relay boards. This circuit is protected from overload by means of a slow-firing fuse. It can operate directly on a 115 volt A.C. machine control circuit and can control currents up to 6 amperes.

The pulser shown in FIG. 3 is required to provide inputs to the sequencer 51 and the counter 58. The input is in the form of a contact closure of a mercury-wetted relay. The relay is located on one of the relay boards in the logic section. In this circuit, the relay coil is connected to voltage pulses obtained by a half-wave rectification of the A.C. side of the 24-volt power supply. The relay, when energized, will actuate a pulse at a 60-step per second rate.

The squencer section of the control unit (see FIG. 7) converts the pulses from the pulser into the correct switching sequence required to drive the stepping motor in its chosen direction. This section consists of two reed-type flip-flop boards and two relay boards. The two flip-flops are connected in such a manner that the output contacts of one flip-flop are connected to the input terminal of the opposite flip-flop. With the flip-flops wired in this manner, it takes four pulses for the circuit to complete one cycle. Each pulse will move the motor one step. In order to change the direction of the rotation of the motor, the two inputs to each flip-flop are interchanged. This is done by means of the double-pole double-throw reed relays located on the relay boards. It changes the sequence of operation of the flip-flops which, in turn, reverses the motor.

The driver circuit is shown in FIG. 8. An output contact from each of the two sequencer flip-flops energizes single-pole double-throw mercury-wetted relays. The contacts of these relays are used for switching the 24-volt D.C. current on the motor windings. Each of these contacts are protected by a network consisting of a resistor and capacitor in series. With the contacts protected in this manner and at this switching load these mercury-wetted relays have a life expectancy of more than a billion operations.

The counter section of the system is shown in FIG. 9. This section consists of six reed-type flip-flop boards connected as a binary-coded decimal counter. The flip-flops have count values of "1," "2," "4," "8," "10," and "20" to give a count range from zero to 39. This counter, like the sequencer circuit, is operated by the pulsing relay. The counter always starts the cycle with a zero count and counts up to the predetermined count on the count-setting switch. This count-setting switch is connected in series with the output contacts from each counter board. This circuit is normally closed and will open to stop the pulses when the set count is reached. The counter will reset to zero at the end of the counting cycle.

The power supply shown in FIG. 10 for the slide control unit is rated for 24-volts D.C. at 3 amp. and the negative terminal is grounded to the chassis. The transformer used for this supply has a 115-volt D.C. primary and a 40-volt center tap secondary winding. One of these secondary windings with respect to the center tap is used to energize the pulsing relay. Two silicon rectifiers, 176 and 177, are also connected to this secondary winding to make up a full wave center tap D.C. supply. 120 cycle pulses are filtered by means of a rectifier-capacitor filter network.

In conclusion, then, it should be pointed out that the well-known system of wheel wear compensation on most grinding machines is by means of a hydraulically-actuated mechanism. The slide reset function at wheel wear is accomplished by means of an electro-mechanical mechanism and is usually located beneath the cross-slide which makes it very difficult and expensive to service. Such a unit has many machine parts which require precise and time-consuming alignment. The present new method of compensation and the like by an electro-mechanical means using a stepping motor is superior. The stepping motor is coupled to the compensating screw by a 20:1 gear train.

Compensation is accomplished by stepping the motor at a fixed, preset number of increments at a 60-step second rate. Each step or increment will move the compensating slide .000050 inch actually or .00001 inch on the diameter of the workpiece. The system has been designed to step up to 39 increments per cycle, which is .0039 inch on diameter. This compares to the maximum compensation of .004 diameter used on most present mechanical units. The same motor is also used to reset the slide at wheel wear and, on that occasion, the motor is pulsed in the opposite direction at a 60-step per second rate until the new wheel switch 43 on the cross-slide is actuated.

This new method of compensation-retraction offers many advantages. First of all, with regard to reliability, the reed-type control modules used in the present invention have a life expectancy of at least 200 million operations which would amount to about seven years of operation on a regular controlled-force grinding machine operating 20 hours a day for 300 days a year with a 15 second average cycle time and the compensation set at .001 on diameter. A prototype unit built for this purpose has cycled continuously at the rate of one cycle per second operating at 25 steps per cycle and and has completed 200 million steps without missing a single step. With regard to accuracy, a much higher degree is expected with this system because the motor will repeat within 5% of a step and this error is non-accumulative. This means that the output shaft of the motor will repeat within .00005 inch on diameter. The actual repeatability of the system, of course, depends upon the quality of the gear train used between the motor shaft and the compensation screw. This system is more serviceable than the present known types because all of the parts are accessible. The electronic control modules are built to be a plug-in type and can be changed in the matter of minutes, if necessary. This type of compensation is much more versatile than the present method. It permits the front panel of the cross-slide to be simplified to allow for a more logical layout of the slide controls, whereas the presently built machines have a front panel which is clustered with controls leaving no space for further improvements that can be incorporated into machines of this type. The present construction has the feature that more than one value of compensation can be used in a particular setup. This could be done by electrically switching a different count to the control unit any time a different value of compensation is desired. This would be useful in producing a new dress-off cycle or for a skip-dress cycle on a machine for grinding the tracks in ball bearings. It is contemplated that the handwheel would be scribed with lines 1.8° apart to give a read-out of the compensation in .00001 inch increments on diameter. This is also useful in setting up the machine where the slide must be positioned a known amount to set the tooling. A mechanical read-out counter can be connected to the motor shaft to give an accurate read-out of the compensation slide with respect to the machine base. This would let the operator know at a glance how much grinding wheel he has remaining at any given time before it is necessary to place a new wheel on the shaft. All of the controls are located on the machine push button station. The value of compensation is selected by means of two selector switches, the value of compensation to be changed an exact known amount without guesswork or by trial. Finally, the cost of the present system is considerably less than the old hydraulic system.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machine tool, comprising:
   (a) a base,
   (b) a workhead mounted on the base for supporting and rotating a workpiece having an annular surface to be finished,
   (c) a wheelhead mounted on the base for supporting and rotating an abrasive wheel,
   (d) a coarse feed means for bringing about relative movement between the workhead and the wheelhead to cause engagement of the wheel with the said surface of the workpiece for a grinding operation,
   (e) a dresser for removing portions of the wheel from time to time to renew its surface,
   (f) a fine feed means for bringing about small incremental relative movement between the workhead and the wheelhead to compensate for the reduction in size of wheel due to the removing of portions by the dresser, and said fine feed means consisting of a screw and a stepping motor, and
   (g) a control for the stepping motor, including a pulser, a logic section, a counter, a sequencer, and a driver arranged to provide pulses to the motor in a predetermined amount and in a predetermined manner.

2. A machine tool, comprising:
   (a) a base,
   (b) a workhead mounted on the base for supporting and rotating a workpiece having an annular surface to be finished,
   (c) a wheelhead mounted on the base for supporting and rotating an abrasive wheel,
   (d) a coarse feed means for bringing about relative movement between the workhead and the wheelhead to cause engagement of the wheel with the said surface of the workpiece for a grinding operation,
   (e) a dresser for removing portions of the wheel from time to time to renew its surface,
   (f) a fine feed means for bringing about small incremental relative movement between the workhead and the wheelhead to compensate for the reduction in size of the wheel due to the removing of portions by the dresser, the said fine feed means consisting of a screw and a stepping motor, the fine feed means being connected to retract the wheelhead a predetermined amount when the wheel has been reduced in size close to an unusable condition.

3. A machine tool, comprising:
   (a) a base,
   (b) a workhead mounted on the base for supporting and rotating a workpiece having an annular surface to be finished,
   (c) a wheelhead mounted on the base for supporting and rotating an abrasive wheel,
   (d) a coarse feed means for moving the wheelhead and the workhead relative to one another for a grinding cycle,
   (e) a fine feed means operative by electrical pulses for bringing about incremental movement between the wheelhead and the workhead, and
   (f) pulse supplying means connected to the fine feed means and including means for determining the number of pulses supplied during various portions of the grinding cycle.

4. A machine tool as recited in claim 3, wherein the pulse supplying means provides a predetermined number of pulses to compensate for dressing of the wheel and a predetermined number of pulses to retract the wheelhead when the wheel is reduced in size by a predetermined amount.

5. A machine tool as recited in claim 3, wherein the pulse supplying means during each grinding cycle in which dressing takes place provides a predetermined number of pulses to retract the wheelhead and later provides the same predetermined number of pulses to advance the wheelhead.

6. A machine tool, comprising:
   (a) a base,
   (b) a workhead mounted on the base for supporting and rotating a workpiece having a surface of revolution to be finished,
   (c) a wheelhead mounted on the base for supporting and rotating an abrasive wheel,
   (d) a dresser,
   (e) a first feed means for bringing about relative movement between the wheelhead and the workhead in a direction transverse of the axis of the said surface of revolution,
   (f) second feed means for bringing about relative movement between the wheelhead and the workhead in a direction parallel to the axis of the surface of revolution,
   (g) a third feed means consisting of a stepping motor actuated by electrical pulses for bringing about relative movement between the wheelhead and the workhead in a direction perpendicular to the axis of the surface of revolution, and
   (h) a control operative to regulate the first, second, and third feed means to produce a grinding cycle including a rough grind, a retraction consisting in part of a dress compensation increment and in part of a stress avoidance increment, a dress, a return movement equal in amount to the stress avoidance increment but in the opposite direction, and a finish grind.

7. A machine tool as recited in claim 6, wherein the rough grind is produced by the first feed means, the retraction is produced by the third feed means, the dress is produced by the second feed means, the return movement is produced by the third feed means, and the finish grind is produced by the first feed means.

8. A machine tool as recited in claim 6, wherein a major retraction movement is produced by the said third feed means when a predetermined amount of wear has taken place in the tool.

9. A machine tool as recited in claim 8, wherein the size of the dress compensation increment, the stress avoidance increment, and the major retraction movement are determined by a predetermined number of electrical pulses delivered to the third feed means.

References Cited

UNITED STATES PATENTS

| | | | |
|---|---|---|---|
| 2,897,638 | 8/1959 | Maker | 51—50 X |
| 3,137,103 | 6/1964 | Stade et al. | 51—165 |
| 3,327,432 | 6/1967 | Lockwood | 51—165 |

LESTER M. SWINGLE, *Primary Examiner.*